(12) United States Patent
Akiyama et al.

(10) Patent No.: US 7,088,668 B1
(45) Date of Patent: Aug. 8, 2006

(54) OPTICAL RECORDING MEDIUM WITH ADDRESS INFORMATION COMPOSED OF PITS

(75) Inventors: Tetsuya Akiyama, Hirakata (JP); Kenichi Nishiuchi, Hirakata (JP); Shigeaki Furukawa, Kadoma (JP); Tomoyoshi Miyake, Nabari (JP); Masahiko Tsukuda, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 385 days.

(21) Appl. No.: 10/089,402

(22) PCT Filed: Jul. 13, 2000

(86) PCT No.: PCT/JP00/06292

§ 371 (c)(1),
(2), (4) Date: Mar. 28, 2002

(87) PCT Pub. No.: WO01/29834

PCT Pub. Date: Apr. 26, 2001

(30) Foreign Application Priority Data

Oct. 19, 1999 (JP) ................................. 11-296389

(51) Int. Cl.
*G11B 7/00* (2006.01)
(52) U.S. Cl. .................. 369/275.4; 369/275.3
(58) Field of Classification Search .......... 369/275.3, 369/275.4, 30.01, 30.03, 30.04, 30.1, 47.22, 369/47.27, 59.25, 112.23
See application file for complete search history.

(56) References Cited

U.S. PATENT DOCUMENTS 4,712,204 A * 12/1987 Takemura et al. ........ 369/30.27
5,220,556 A * 6/1993 Shimizu .................. 369/275.1

(Continued)

FOREIGN PATENT DOCUMENTS

EP        0 588 305 A2    3/1994

(Continued)

OTHER PUBLICATIONS

Translation of JP 11203710 A.*

*Primary Examiner*—Brian E. Miller
*Assistant Examiner*—Peter Vincent Agustin
(74) *Attorney, Agent, or Firm*—Hamre, Schumann, Mueller & Larson, P.C.

(57) ABSTRACT

The width W of the address pit (9) of an optical recording medium of intermediate address type is determined by W=k Tp/(λ/NA) where λ is the laser wavelength of the optical head of the optical disk device use, NA is the numerical aperture of the objective, Tp is the track pitch of the record medium, and k is 0.40≦k≦0.68. Alternatively, an optical device comprises a first address demodulating circuit for demodulating address information by using a signal that is the sum of the electric signals outputted from a pair of photodetectors separated in the direction of the track and a second address demodulating circuit for demodulating address information by suing a signal that is the difference between the electric signals. The address is detected base on the information thus obtained. In such a way, the compatibility of the recording medium used and that of the optical device are improved, the reproduction margin in demodulating the address information is increased, realizing high accuracy address detection when reproducing data from an optical recorded medium of intermediate address type.

4 Claims, 10 Drawing Sheets

U.S. PATENT DOCUMENTS

| | | | |
|---|---|---|---|
| 5,422,874 A * | 6/1995 | Birukawa et al. | 369/275.2 |
| 5,638,354 A | 6/1997 | Nakayama et al. | |
| 5,666,336 A * | 9/1997 | Yoshida | 369/30.11 |
| 5,673,250 A | 9/1997 | Mieda et al. | |
| 5,696,742 A * | 12/1997 | Ogata et al. | 369/47.22 |
| 5,784,354 A * | 7/1998 | Lee | 369/112.19 |
| 6,320,830 B1 * | 11/2001 | Tsukamoto et al. | 369/47.19 |

FOREIGN PATENT DOCUMENTS

| | | |
|---|---|---|
| EP | 0 801 382 A2 | 10/1997 |
| EP | 0 867 869 A2 | 9/1998 |
| EP | 0 933 758 A2 | 8/1999 |
| EP | 0 973 155 A2 | 1/2000 |
| JP | 59-177744 | 10/1984 |
| JP | 6-176404 | 6/1994 |
| JP | 7-220282 | 8/1995 |
| JP | 10-31822 A | 2/1998 |
| JP | 11-162019 | 6/1999 |
| JP | 11-203710 A | 7/1999 |

* cited by examiner

OPTICAL RECORDING MEDIUM WITH ADDRESS INFORMATION COMPOSED OF PITS

TECHNICAL FIELD

The present invention relates to an optical recording medium for recording and/or reproducing information by irradiation with a laser beam or the like, a substrate for the optical recording medium, and an optical disk device.

BACKGROUND ART

Among optical recording media that have come into focus as large-capacity and high-density memories is an erasable optical recording medium that allows rewriting of information. Currently, the development of the erasable optical recording medium has been underway. In one form of the erasable optical recording medium, information is recorded and erased utilizing thermal energy generated by irradiation with a laser beam. The recording medium includes a transparent substrate of a general disk shape and a recording layer provided on the substrate. The recording layer is formed of a thin film in which a phase change is caused between an amorphous state and a crystalline state.

Phase change materials known to be used for the recording layer include an alloy film mainly containing elements such as Ge, Sb, Te, and In of, for example, a GeSbTe alloy. In many cases, information is recorded in such a manner that the recording layer is partially brought into an amorphous state to form a mark and erased in such a manner that the mark in the amorphous state is brought into a crystalline state. When heated to a temperature equal to or higher than the melting point and subsequently cooled at a speed higher than a fixed speed, the recording layer is brought into the amorphous state. When heated to a temperature equal to or higher than the crystallization temperature and equal to or lower than the melting point, the recording layer is brought into the crystalline state.

Generally, on the substrate, guide groves (grooves) in the form of a spiral or concentric circles for tracking a laser beam in recording and reproducing information and addresses for indicating a position on the recording medium, each composed of uneven strings of pits, are provided to form an initial state of the substrate. A region between the adjoining grooves is referred to as a land. In many cases, information is recorded on one of the groove and the land, and the other serves as a guard band for separating adjoining recording tracks from each other.

In recent years, the improvement in processing capabilities of various kinds of information-processing equipment has allowed the processing of an increasing amount of information. Thus, a recording medium has been requested to allow larger-capacity information recording and reproducing. In order to attain this, DVD-RAM or the like has employed a method in which information is recorded on both of the groove and the land, so that a higher track density can be obtained. In this case, the groove and the land are set so as to be substantially equal in width. Recording media of this kind have employed a method in which address information is recorded in an intermediate position between a pair of adjoining groove and land tracks so that with respect to the pair of adjoining groove and land tracks, one address in formation is recorded.

An address recorded in this manner in the intermediate position between the pair of adjoining groove and land tracks is referred to as "an intermediate address". Further, a method in which the intermediate address is used to record address information so that the address information is shared by a pair of adjoining tracks is referred to as "an intermediate address method".

In JP10(1998)-31822 A, a method of demodulating address information in a recording medium employing the intermediate address method is disclosed. In the method, a sum signal or a difference signal of electric signals output from a photodetector provided in an optical head of an optical disk device is used to demodulate the address information. The photodetector includes light receiving parts divided into two parts in a direction parallel to tracks on the recording medium.

Figure 10:
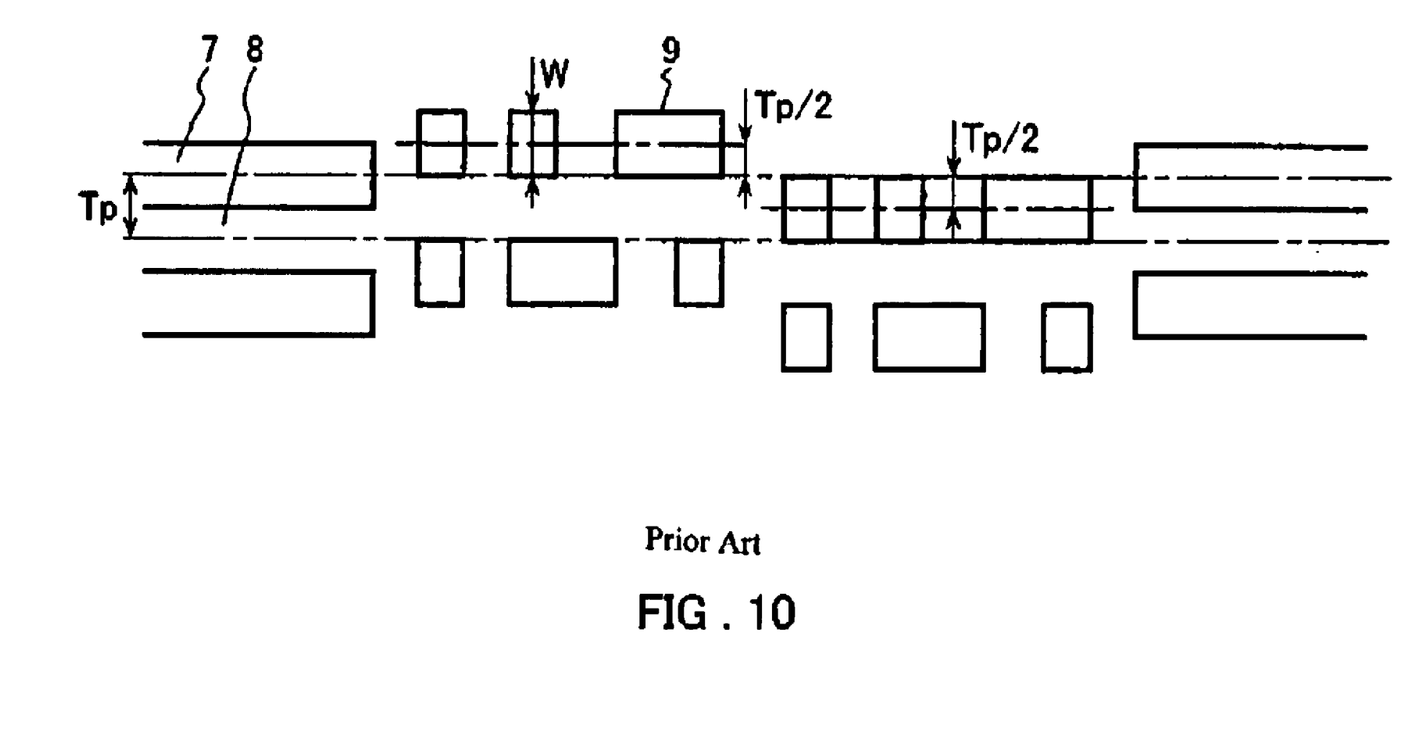
FIG. 10 is a fragmentary expanded plan view of the conventional optical recording medium.

In this connection, a signal quality assessment was conducted using reproduction signals obtained by reproducing an address on a recording medium formed in the following manner. As shown in FIG. 10, address pits 9 were arranged in the form of staggered pit strings so that with respect to a distance (a track pitch) Tp between a center line of a groove track 7 and a center line of a land track 8, center lines of strings of the address pits 9 were shifted in a radial direction of the recording medium (namely, a direction perpendicular to the tracks) at a distance of about Tp/2 from the center lines of the groove tracks 7 and the center lines of the land tracks 8. In the recording medium, a pit width W of the address pits 9 was the same as the track pitch Tp (namely, the same as the width of the groove track 7 and the width of the land track 8). As a result, the reproduction signals obtained by reproducing the address differed in symmetry between the sum signal and the difference signal. For each of the sum signal and the difference signal, an optimum condition under which excellent signal quality could be obtained was found by adjusting the lengths of the address pits. However, no condition was found under which such signal quality could be obtained for both of the sum signal and the difference signal at the same time.

That is, neither of the following cases allows sufficient signal quality to be obtained, which has led to a problem of a limited margin for reproduction conditions. In one case, a recording medium suited for address information demodulation using the sum signal is employed in an optical disk device in which address information demodulation is performed using the difference signal. In the other case, a recording medium suited for address information demodulation using the difference signal is employed in an optical disk device in which address information demodulation is performed using the sum signal. In other words, in each of the optical disk devices in which address information demodulation is performed using the sum signal and the difference signal, respectively, a permissible level of variations in address forming conditions of recording media is limited.

DISCLOSURE OF THE INVENTION

The present invention is intended to solve the conventional problem as described above. It is an object of the present invention to provide an optical recording medium that allows reliable address information reproduction using either a sum signal or a difference signal of electric signals output from a photodetector provided in an optical head of an optical disk device, thereby enhancing compatibility of the optical disk device being used and a substrate for the optical recording medium. It is another object of the present invention to provide an optical disk device that allows an increased reproduction margin in demodulating address information, thereby achieving high-accuracy address detection.

In order to achieve the aforementioned objects, an optical recording medium (or a substrate for the optical recording medium) of the present invention is an optical recording medium (or a substrate for the optical recording medium) employment in the intermediate address method, in which an address pit width (namely, a length of an address pit in an intermediate position of a depth (or a height) of a concave or a convex of the address pit in a radial direction of the recording medium) W satisfies the relationship:

$$W = k \cdot Tp/(\lambda/NA)$$

$$0.40 \ \mu m \leq k \leq 0.68 \ \mu m$$

with respect to a laser wavelength λ an a numeral aperture NA of an objective lens of an optical head of an optical disk device being used, and a track pitch Tp of the recording medium. According to this configuration, address information can be reproduced with reliability using either a sum signal or a difference signal of electrical signals output from light receiving parts, divided into two parts in a direction parallel to tracks, of a photodetector provided in the optical head of the optical disk device, thereby enhancing compatibility of the optical disk device being used.

Furthermore, an optical disk device of the present invention includes a first address demodulating circuit for demodulating address information using the sum signal and a second address demodulating circuit for demodulating address information using the difference signal, and thus an address can be detected with high accuracy based on information obtained from the first and second address demodulating circuits.

BEST MODE FOR CARRYING OUT THE INVENTION

Hereinafter, the optical recording medium and the optical disk device of the present invention will be described with reference to the appended drawings.

First Embodiment

A first embodiment relates to an optical recording medium and a substrate used in manufacturing the optical recording medium.

The inventors of the present invention conducted a test using recording media having the structure employing the intermediate address method described with reference to FIG. 10 that were manufactured by varying the pit width W of the address pits 9. In the test, the recording media were reproduced for the measurement of the quality of a sum signal and a difference signal of electric signals that were output from a photodetector provided in an optical head of an optical disk device in an address area on the respective recording media. The test has shown that an address reproduction signal having excellent signal quality can be obtained in both of the cases of the sum signal and the difference signal by setting the pit width W of the address pits so as to fall within a fixed range. This will be explained in the following.

Figure 1:
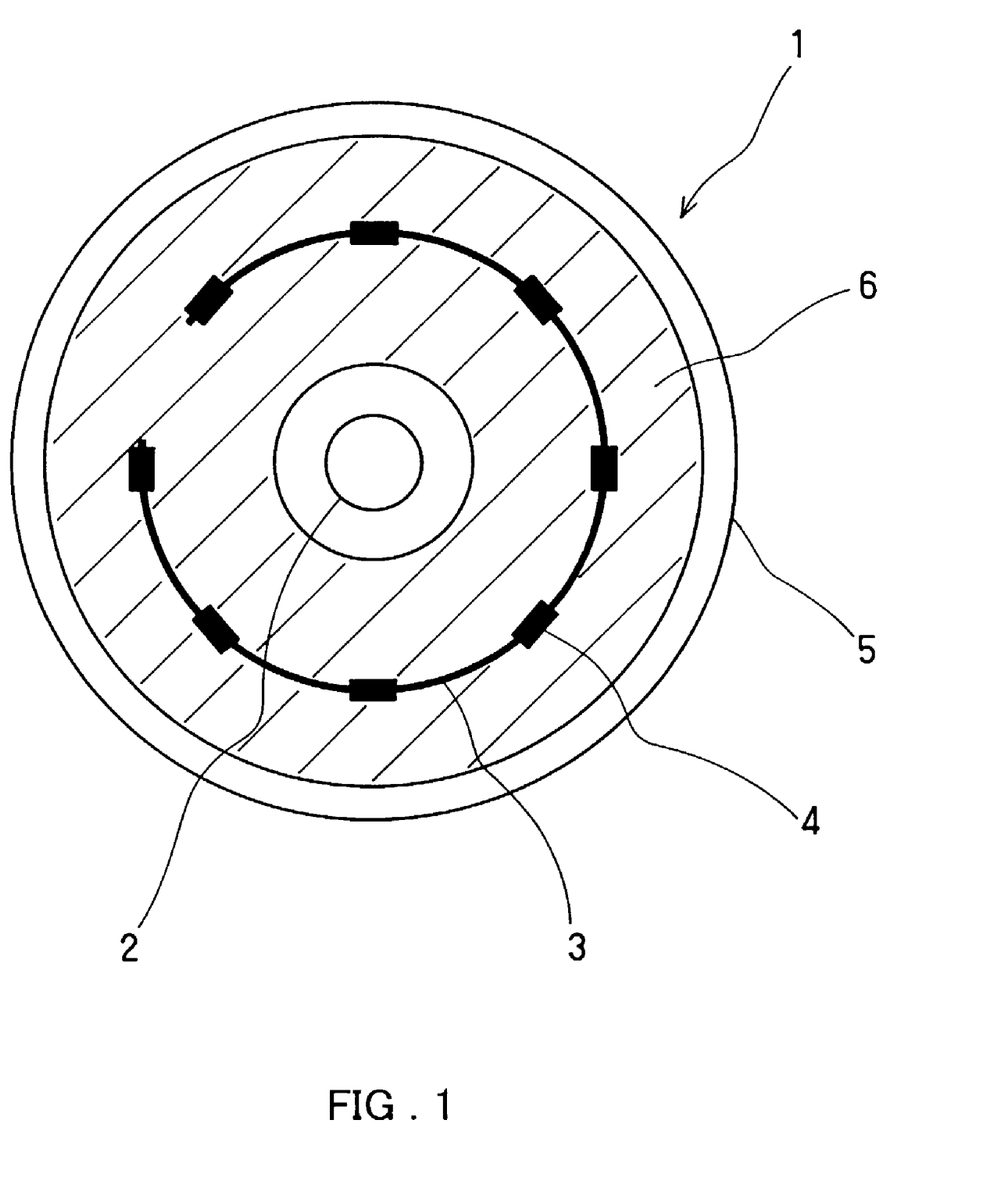
FIG. 1 is a plan view schematically showing the configuration of an optical recording medium of an embodiment according to the present invention.
Figure 2:
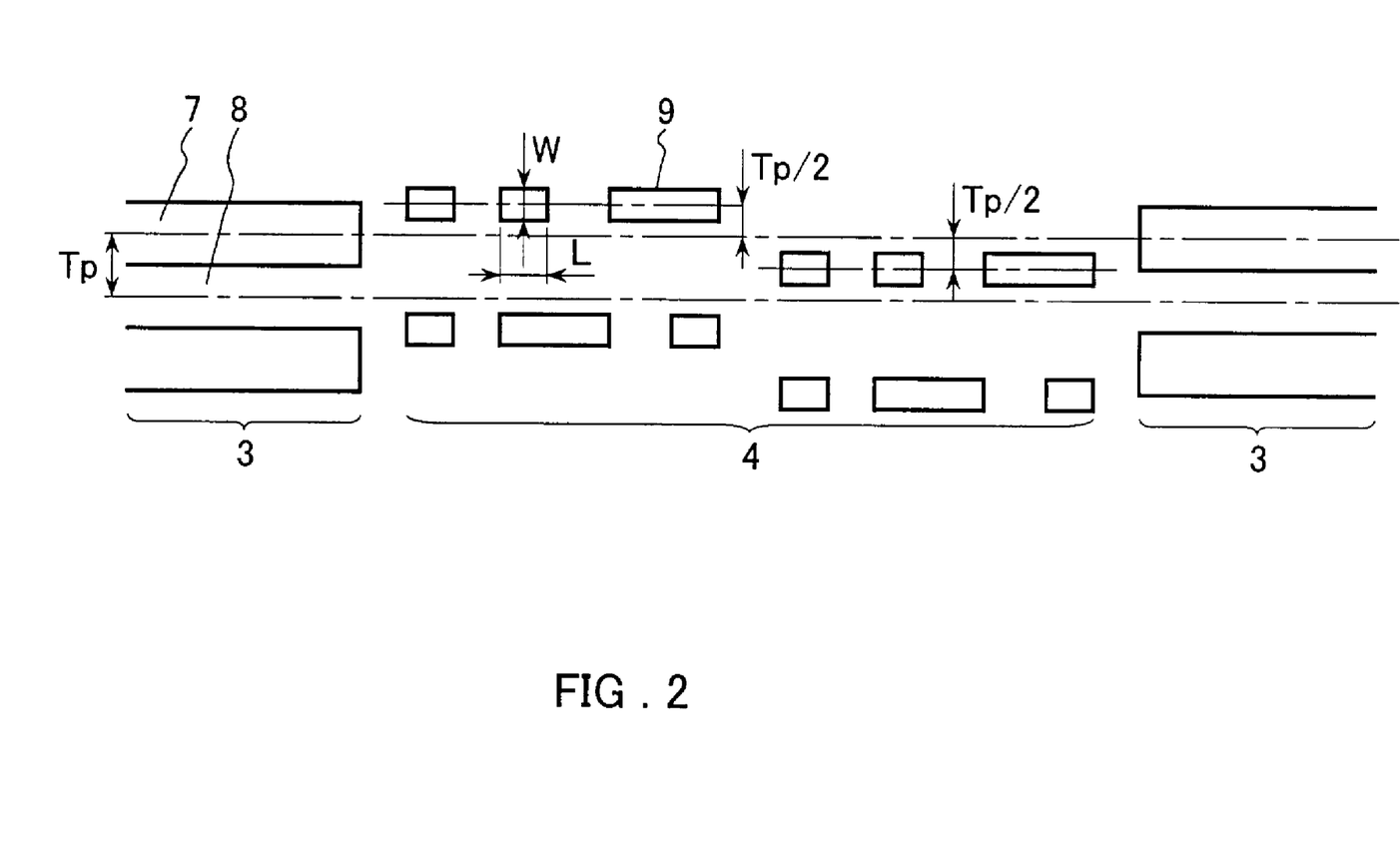
FIG. 2 is a fragmentary enlarged plan view of the optical recording medium of the embodiment according to the present invention.

FIG. 1 is a plan view schematically showing the configuration of the optical recording medium of the present invention, and FIG. 2 is a fragmentary enlarged plan view showing the structure of an address area on the optical recording medium of the present invention. In FIG. 1, an optical recording medium 1 includes a substrate 5 made of polycarbonate that has a thickness of 0.6 mm, a recording layer 6 provided on the substrate 5, of a multi-layered thin film formed by laminating a ZnS-SiO$_2$ thin film as a dielectric, a GeSbTe alloy thin film as a phase change material, a ZnS-SiO$_2$ thin film, and an Al alloy thin film in this order, and a protective layer (not shown) provided on the recording layer 6, formed of an ultraviolet hardening resin. The GeSbTe alloy thin film is brought into a crystalline state by irradiation with a laser beam to form an initial state of the film. The recording layer 6 has a reflectance of about 20% with respect to a light beam having a wavelength of 650 nm. The substrate 5 includes a center hole 2 for fitting the optical recording medium to an optical disk device, tracks 3 in the form of a spiral, and address 4 for the indicating a position on the optical recording medium. In FIG. 1, the tracks 3 and the addresses 4 are shown exemplarily in the form of exaggerated portions of the tracks 3 and the addresses 4, respectively.

In FIG. 2, the tracks 3 are composed of groove tracks 7 having a depth of about 65 nm and a width of about 0.62 μm and land tracks 8 having a width of about 0.62 μm that are provided alternately. Information is recorded on both of the groove tracks 7 and the land tracks 8. The address 4 is encoded by a (8–16) modulation method and composed of uneven strings of pits (address pits) 9 and spaces. The address pits 9 have a length L varied between 3T and 11T by 0.5T with respect to a reference clock T. The address pits 9 having a depth of about 65 nm are arranged in the form of staggered pit strings so that center lines of strings of the address pits 9 are shifted in a radial direction of the recording medium (namely, a direction perpendicular to the tracks 3) at a distance of about 0.31 μm, which is one-half a track pitch Tp (namely, the width of the groove tracks 7 and the width of the land tracks 8) from center lines of the groove tracks 7 and center lines of the land tracks 8. In the test conducted this time, substrates were prepared by varying the width W of the address pits 9 between 0.23 μm and 0.40 μm and used. These substrates were molded by an injection molding method using a stamper made of Ni.

Figure 3:
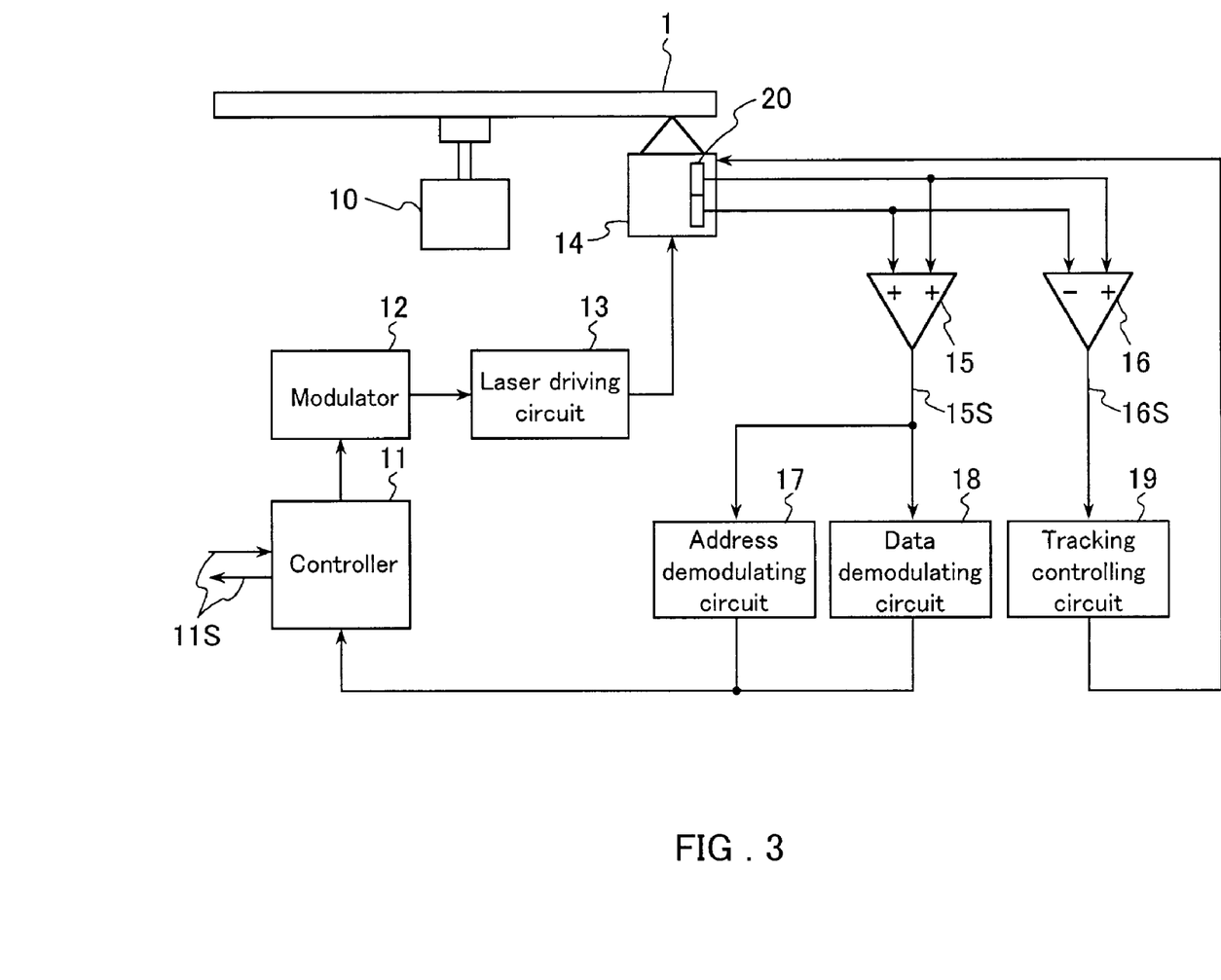
FIG. 3 is a block diagram showing a first configuration of a conventional optical disk device for an optical recording medium.
Figure 4:
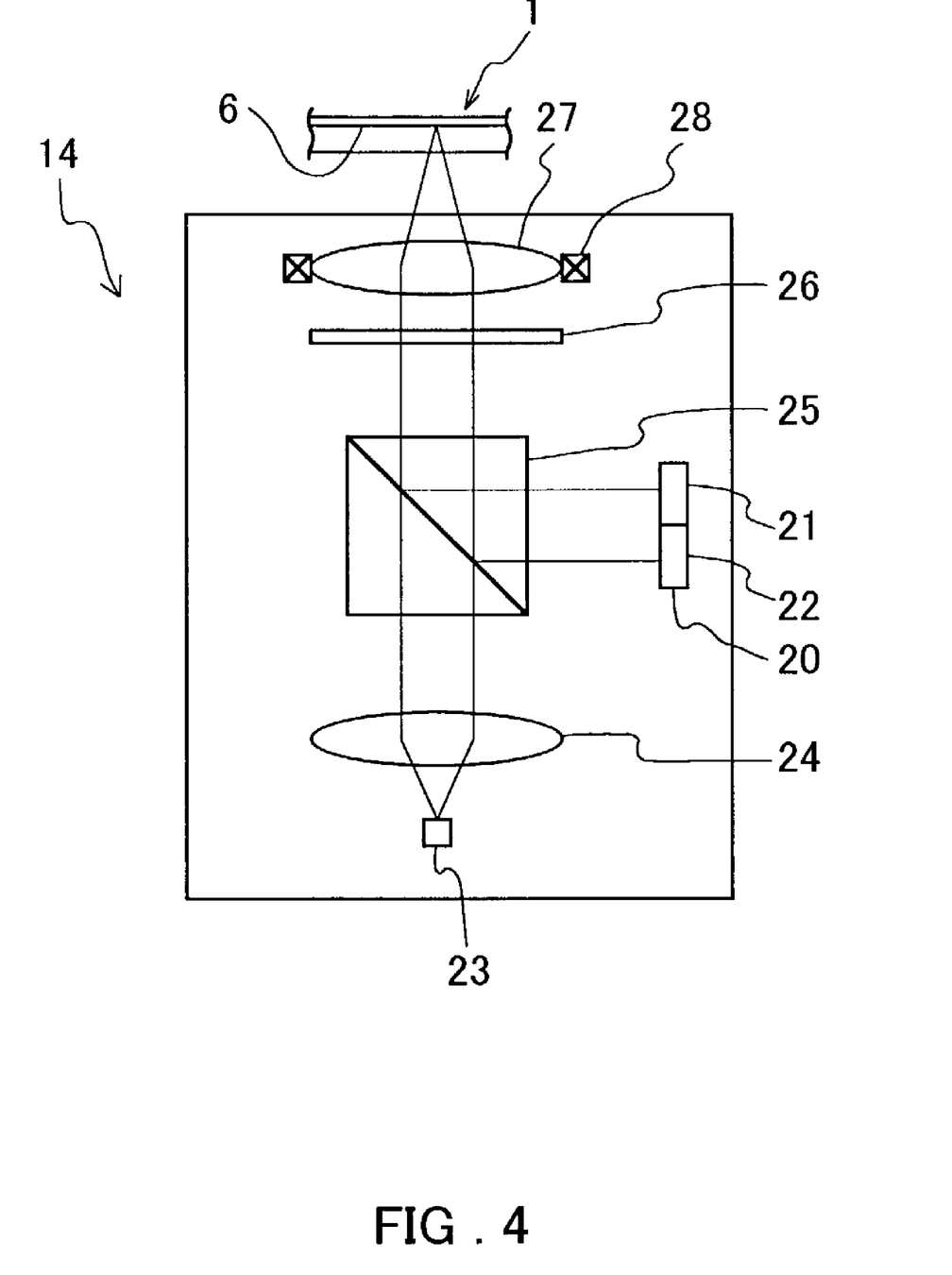
FIG. 4 is a structural view showing an optical head of the conventional optical disk device for the optical recording medium.
Figure 5:
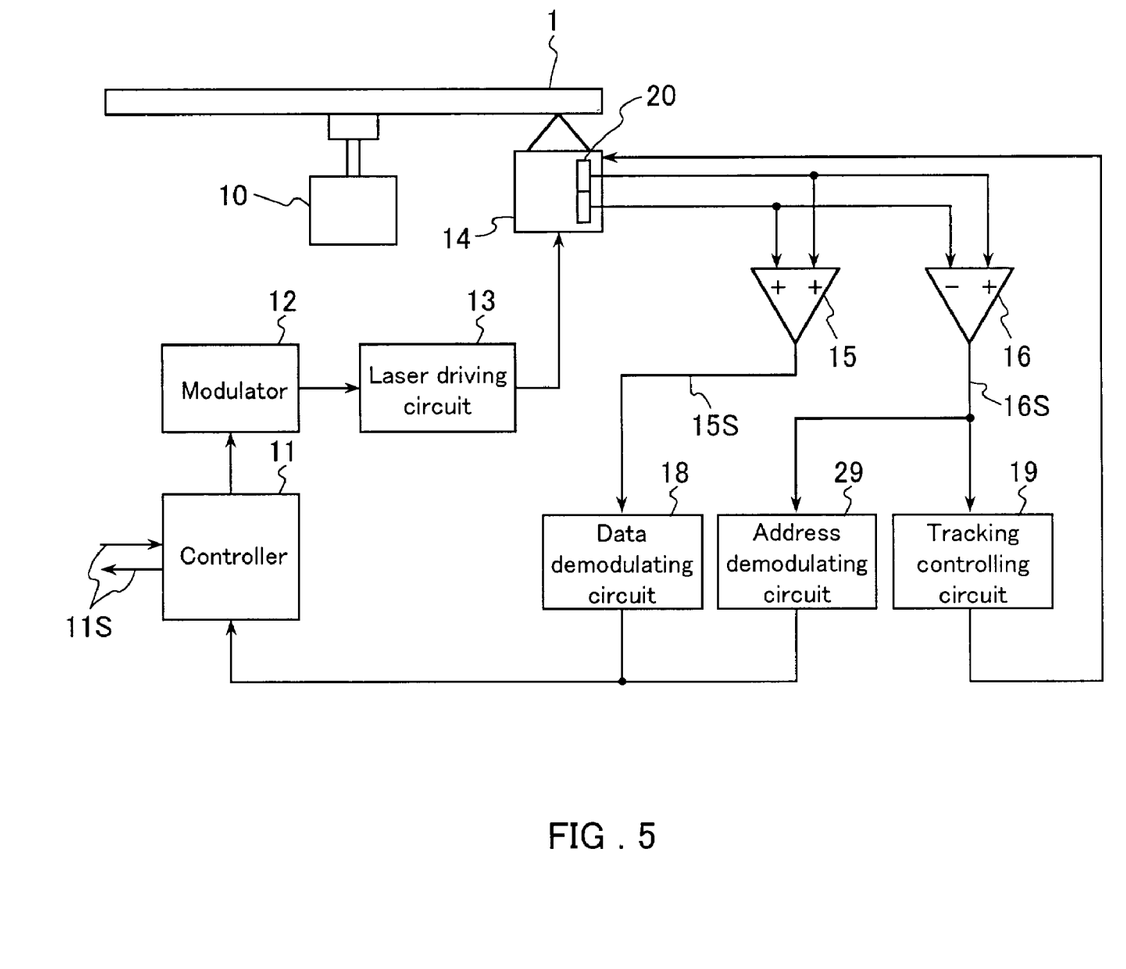
FIG. 5 is a block diagram showing a second configuration of the conventional optical disk device for the optical recording medium.

FIGS. 3 and 5 are block diagrams exemplarily showing optical disk devices used in the test. FIG. 3 shows the optical disk device in which address information is demodulated using a sum signal 15S of electric signals output from a photodetector. In FIG. 3, the recording medium 1 shown in FIG. 1 is mounted to the optical disk device. FIG. 4 shows the structure of an optical head 14 of the optical disk device.

In FIG. 4, a light beam emitted from a semiconductor laser as a light source 23 is focused on the recording medium 1 through a collimator lens 24, a beam splitter 25, a ¼ wave plate 26, and an objective lens 27. A focal point of the light beam is controlled so as to be on the recording layer 6 in the recording medium 1 by adjusting the position of the objective lens 27 using a voice coil 28. The light beam reflected from the recording layer 6 goes back to the beam splitter 25 through the objective lens 27 and the ¼ wave plate 26. Then, the light beam is reflected from the beam splitter 25 and is incident on a photodetector 20 to be converted to an electric signal. The photodetector 20 includes light receiving parts 21 and 22 divided into two parts in a direction parallel to the tracks on the recording medium 1. The semiconductor laser 23 has a laser wavelength of 650 m and the objective lens 27 has a numerical aperture of 0.60.

The optical disk device shown in FIG. 3 includes a spindle motor 10 for rotating the recording medium 1 mounted thereto, a controller 11 for receiving and transmitting data 11S to be recorded or reproduced or the like, a modulator 12 for converting data to be recorded to a recording signal, a laser driving circuit 13 for driving the semiconductor laser according to the recording signal, and the optical head 14 having the semiconductor laser for focusing a laser beam on the recording medium 1 to record information and obtaining a reproduction signal using the reflected laser beam. The optical disk device further includes a summing amplifier 15 for outputting the sum signal 15S of electric signals output from the light receiving parts 21 and 22 of the photodetector 20 provided in the optical head 14, a differential amplifier 16 for outputting a difference signal 16S of electric signals output from the light receiving parts 21 and 22, and address demodulating circuit 17 for demodulating address information using the sum signal 15S, a data demodulating circuit 18 for demodulating data recorded on the tracks using the sum signal 15S, and a tracking controlling circuit 19 for controlling the optical head 14 so that a laser beam scans a track on the recording medium 1 properly based on the difference signal 16S.

FIG. 5 shows the optical disk device in which address information is demodulated using a difference signal 16S of electric signals output from a photodetector 20. The optical disk device has substantially the same configuration as that of the optical disk device described with reference to FIG. 3 and is different only in the method of demodulating address information. As shown in FIG. 5, in an address demodulating circuit 29, address information is demodulated using the difference signal 16S output from a differential amplifier 16. Other than this point, the optical disk device is of the same configuration as that of the optical disk device shown in FIG. 3, and thus the duplicate descriptions are omitted by referring to FIG. 5 in which like reference characters denote the corresponding components shown in FIG. 3.

The optical disk devices and the recording medium described above with reference to FIGS. 3 and 5, in which the recording medium is irradiated with a laser beam having an intensity of 1 mW while being rotated at a linear velocity of 8.2 m/second, were used to measure signal quality of a signal output from the summing amplifier 15 in an address area on the recording medium (namely, a sum signal of electric signals output from the photodetector 20 provided in the optical head 14) and a signal output from the differential amplifier 16 in the address area on the optical recording medium (namely, a difference signal of electric signals output from the photodetector 20 provided in the optical head 14).

Figure 6A:
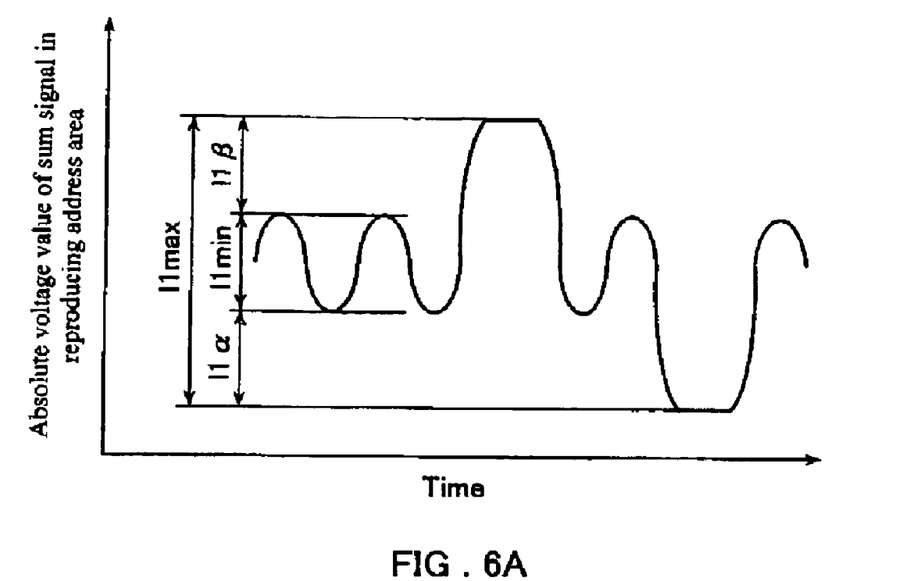
FIG. 6 shows waveforms of address reproduction signals.
Figure 6B:
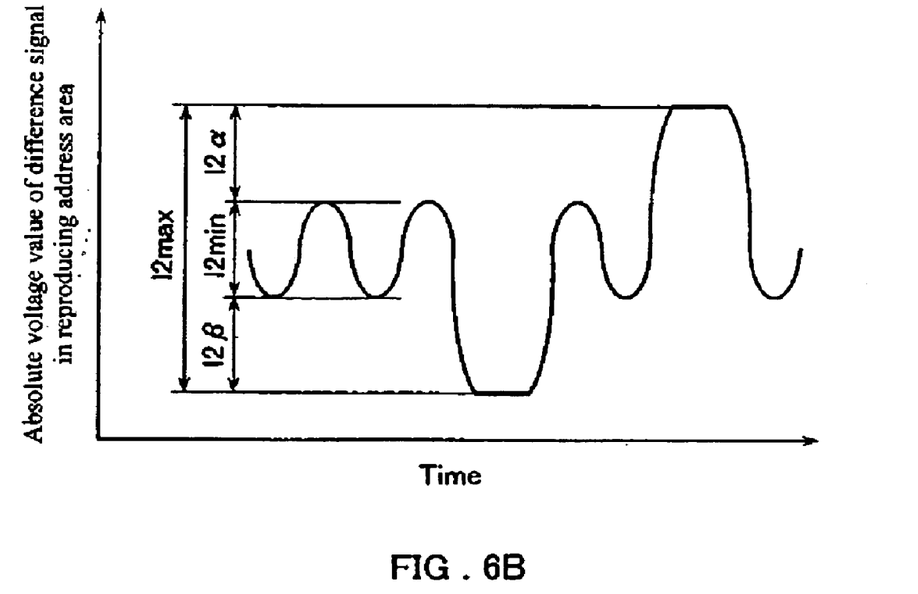

FIGS. 6(A) and 6(B) are waveform charts exemplarily showing absolute voltage values of the sum signal and the difference signal output in reproducing the address area. The signal quality was measured by calculating an asymmetry X1 and an asymmetry X2 defined as follows.

As for the sum signal, where as shown in FIG. 6(A), the maximum amplitude is indicated as I1max, a voltage difference between a value that is highest in a portion of the waveform having the maximum amplitude and a value that is highest in a portion of the waveform having the minimum amplitude (the minimum amplitude is indicated as I1min) as I1β, and a voltage difference between a value that is lowest in the portion of the waveform having the minimum amplitude and a value that is lowest in the portion of the waveform having the maximum amplitude as I1α, the asymmetry X1 is defined by the following expression:

$$X1=(I1\beta-I1\alpha)/2I1max.$$

As for the difference signal, where as shown in FIG. 6(B), the maximum amplitude is indicated as I2max, a voltage difference between a value that is highest in a portion of the waveform having the maximum amplitude and a value that is highest in a portion of the waveform having the minimum amplitude (the minimum amplitude is indicated as I2min) as I2α, and a voltage difference between a value that is lowest in the portion of the waveform having the minimum amplitude and a value that is lowest in the portion of the waveform having the maximum amplitude as I2β, the asymmetry X2 is defined by the following expression:

$$X2=(2\beta-I2\alpha)/2I2max.$$

The closer an asymmetry value of a signal comes to zero, the more improved signal quality the signal has. Generally, it is preferable that the value falls within the range of ±0.1.

Figure 7:
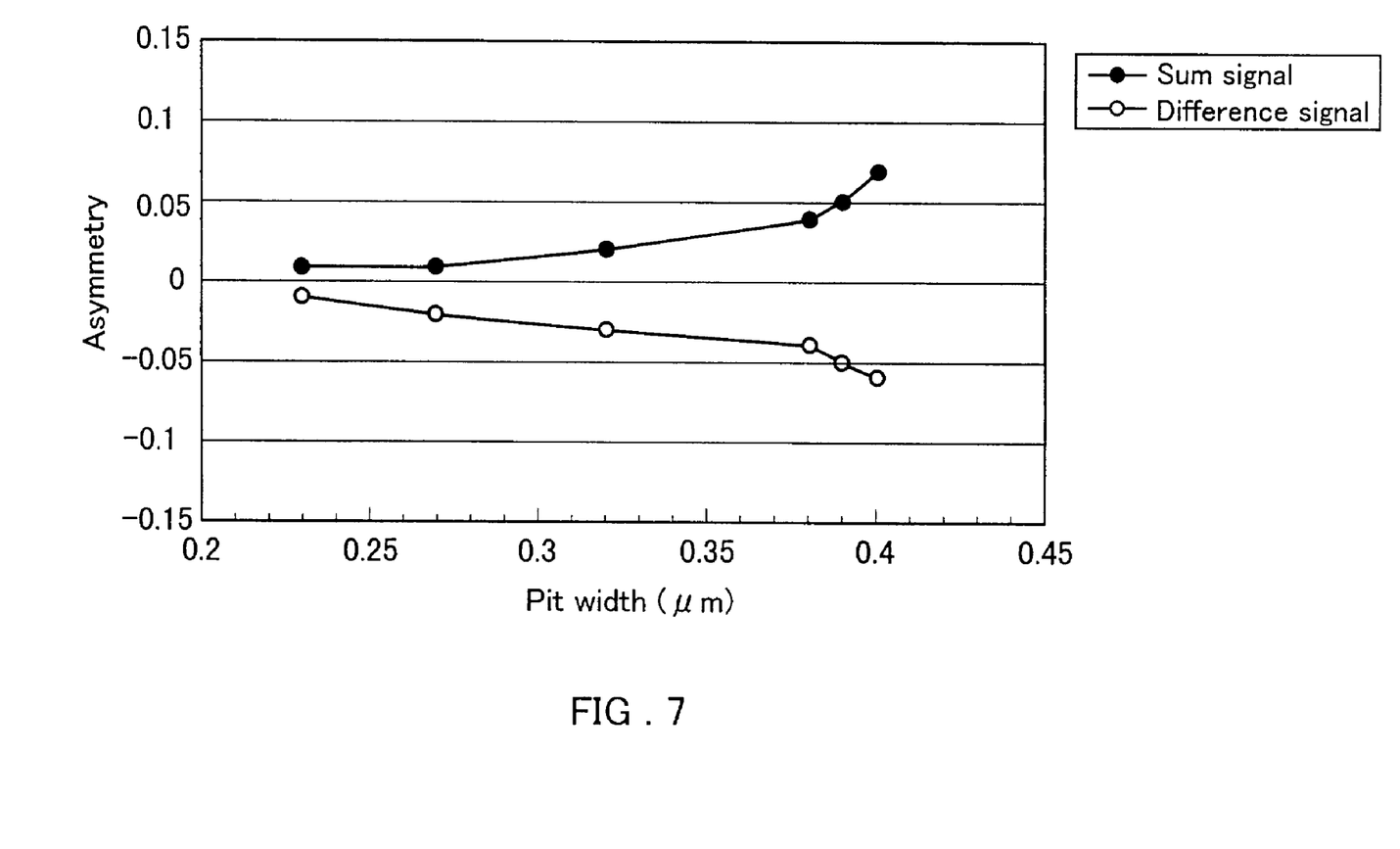
FIG. 7 is a graph showing the relationship between a pit width of an address and asymmetry of reproduction signals obtained by reproducing the address.

The measurement results as shown in FIG. 7. FIG. 7 shows asymmetry of the sum signal and asymmetry of the difference signal with respect to each address pit width. From these results, it is shown that the asymmetry of the difference signal (denoted by open circles in FIG. 7) has lower values than those of the asymmetry of the sum signal (denoted by solid circles in FIG. 7). It is also shown that the smaller an address pit width is, the smaller the difference in asymmetry values between these signals.

Conceivably, this phenomenon is attributable to the following.

Figure 8A:
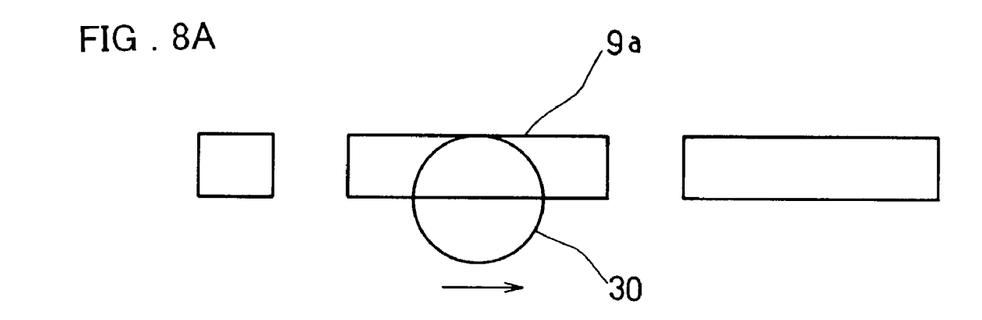
FIG. 8 shows the relationship between an address pit and a beam spot.
Figure 8B:
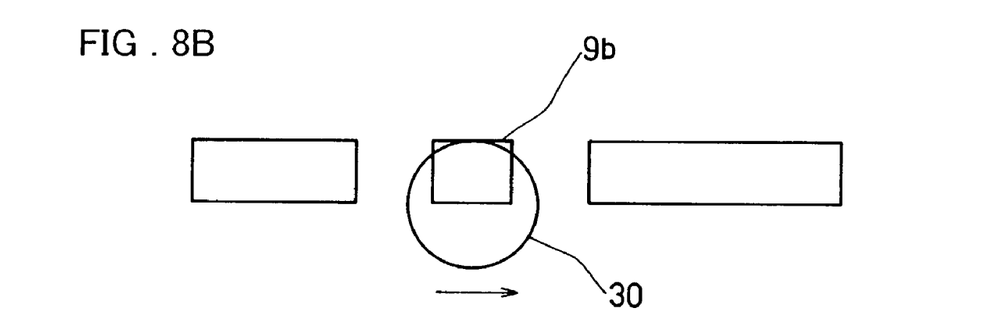

FIGS. 8(A) and 8(B) show the relationship between an address pit and a beam spot of a laser beam in address reproduction. In FIG. 8(A), a beam spot 30 is on an address pit 9a having a length of 11T. In FIG. 8(B), the beam spot 30 is on an address pit 9b having a length of 3T. In FIGS. 8(A) and 8(B), a transverse direction indicates a peripheral direction of a recording medium, and the beam spot 30 scans in a direction indicated by an arrow.

In the case where the address pit is long as shown in FIG. 8(A), the address pit does not have edge portions in the peripheral direction that lie within the beam spot 30, so that the reflected laser beam is diffracted only in a direction perpendicular to the peripheral direction (namely, a radial direction of the recording medium) as in the case where the laser beam is reflected from a track area.

On the contrary, in the case where the address pit is short as shown in FIG. 8(B), the address pit has the edge portions in the peripheral direction that lie within the beam spot 30, so that the reflected laser beam is diffracted in the peripheral direction as well as the direction perpendicular to the peripheral direction. A portion of the reflected laser beam that is diffracted in the peripheral direction is incident on both of the light receiving parts 21 and 22 described with reference to FIG. 4. This produces the effect of decreasing the output of the differential amplifier 16. As a result, the asymmetry of the difference signal has lower values than those of the asymmetry of the sum signal.

It is presumed that the smaller an address pit width is, the smaller the difference in asymmetry values between the sum signal and the difference signal because a decrease in pit width lowers the intensity of the reflected laser beam that is diffracted in the edge portions in the peripheral direction.

A large difference in asymmetry values between the sum signal and the difference signal leads to the difficulty in obtaining excellent signal quality for both of the sum signal and the difference signal. For example, when variations in asymmetry values caused by errors in pit length or the like are assumed to fall within the range of ±0.05, which is half as wide as the range of permissible asymmetry values described above, the difference in asymmetry values between the sum signal and the difference signal is required to be not more than 0.1 to secure the range. Of the recording media varied in pit width used in the test, the recording media having a pit width of not more than 0.39 μm have proven to satisfy this condition. In a recording medium having a pit width of less than 0.23 μm, a sufficient signal intensity of a reproduction signal cannot be obtained. Therefore, preferably, a pit width falls within the range of 0.23 μm to 0.39 μm.

It is conceivable that even if a pit width does not fall within the range employed in the above test, the aforementioned condition can be satisfied when a pit and a laser beam are optically similar in shape to those employed in the test. Thus, the address pit width W that was determined as a preferable width in the test falls within the range satisfying the following relationship:

$$W = k \cdot Tp / (\lambda / NA)$$

$$0.40 \ \mu m \leq K \leq 0.68 \ \mu m$$

with respect to a track pitch TP and ($\lambda$/NA) representing a spot diameter of a laser beam.

Furthermore, although an asymmetry value may vary depending an variations in address pit length, the asymmetry of the difference signal always has a lower value than that of the asymmetry of the sum signal. Therefore, by forming an address pit into a shape that allows an asymmetry value of the sum signal to fall within the range of 0 to 0.05, an address reproduction signal having further improved signal quality can be obtained in both of the cases of the sum signal and the difference signal.

In the aforementioned embodiment, a GeSbTe alloy of a phase change material was used as the recording layer. However, the recording layer may be formed of a material other than a GeSbTe alloy such as a magneto-optical recording material and an organic dye. Further, the recording medium that can be used is not limited to an erasable recording medium that allows rewriting of information. A recordable recording medium on which information can be recorded only once also may be used. Furthermore, the substrate may be formed of a material other than polycarbonate such as glass and acrylic. Moreover, the address pits may be arranged in a row instead of in the form of staggered pit strings. In addition, in the aforementioned embodiment, the tracks 3 were in the form of a spiral. However, the tracks 3 may take the form of concentric circles.

Second Embodiment

A second embodiment relates to an optical disk device employing the optical recording medium described above.

Figure 9:
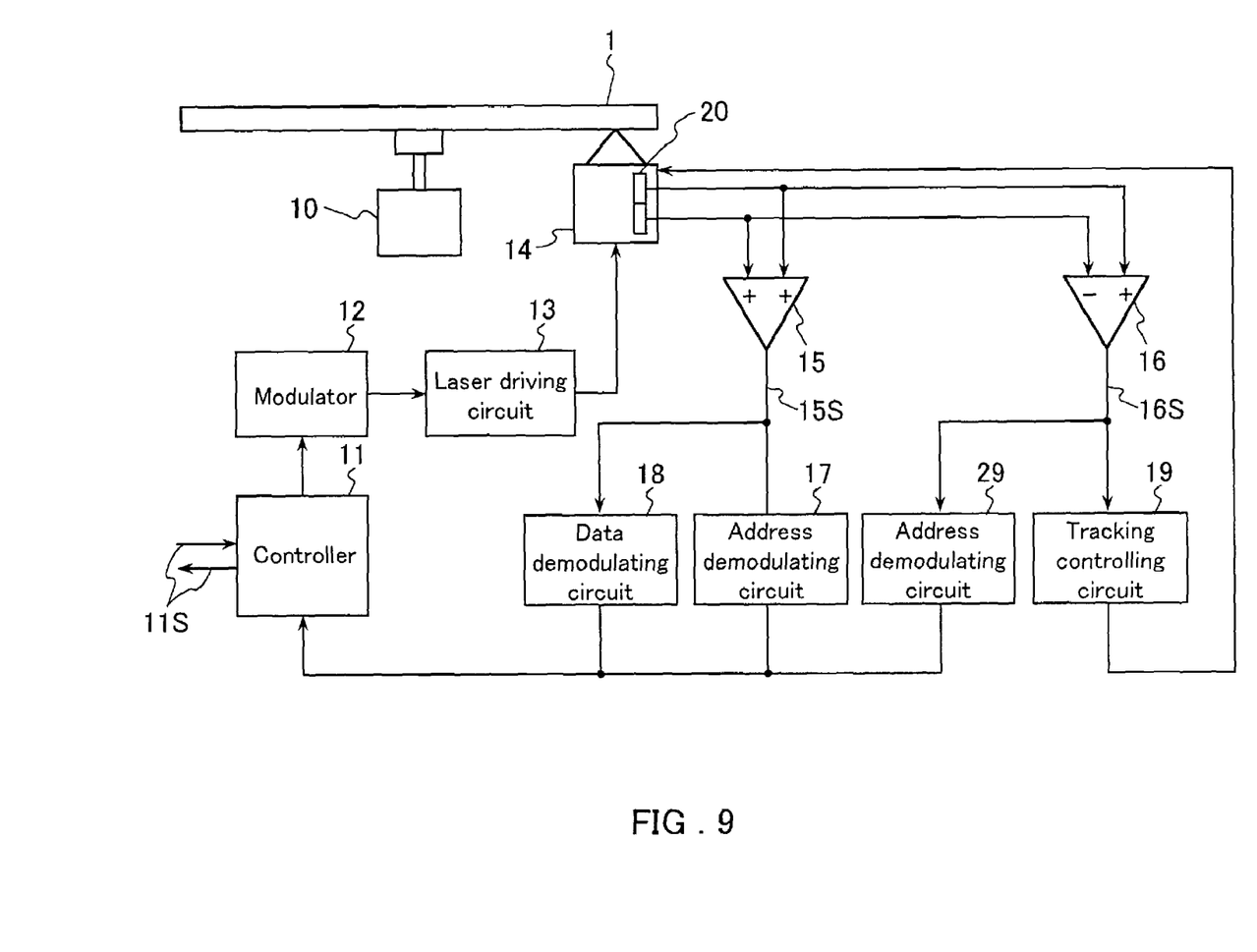
FIG. 9 is a block diagram showing the configuration of an optical disk device for the optical recording medium according to the present invention.

FIG. 9 is a block diagram showing the configuration of an optical disk device of an embodiment according to the present invention. The optical disk device has substantially the same configuration as those described with reference to FIGS. 3 and 5 and is different only in the method of demodulating address information. As shown in FIG. 9, a first address demodulating circuit 17 demodulates address information using a sum signal 15S output from a summing amplifier 15, and a second address demodulating circuit 29 demodulates address information using a difference signal 16S output from a differential amplifier 16.

These two address demodulating circuits 17 and 29 are provided in the device, so that even when the recording medium 1 has variations in address forming conditions, an address can be detected with high accuracy using at least one of the address demodulating circuits. Furthermore, in the case where the optical recording medium of the present invention described in the first embodiment is used as the recording medium 1, address information can be demodulated in both of the address demodulating circuits 17 and 29, and thus the accuracy of address detection further can be increased.

The duplicate descriptions are omitted by referring to FIG. 9 in which like reference characters denote the corresponding components shown in FIGS. 3 and 5.

The embodiments disclosed in this application are intended to illustrate the technical aspects of the invention and not to limit the invention thereto. The invention may be embodied in other forms without departing from the spirit and the scope of the invention as indicated by the appended claims and is to be broadly construed.

The invention claimed is:

1. An optical recording medium for recording, reproducing, or erasing information by irradiation with a laser beam, comprising a disk-shaped transparent substrate and a recording layer formed on the substrate,
   wherein information tracks and addresses are provided on the substrate, the information tracks including groove tracks and land tracks that are arranged either in the form of a spiral or concentric circles, each of the addresses indicating a position on the recording medium and being composed of uneven strings of pits,
   the strings of pits are arranged so that center lines of the strings of pits are shifted in a radial direction of the recording medium at a distance of about one-half of a track pitch from center lines of the groove tracks and center lines of the land tracks, and
   a pit width W of the pits satisfies the relationship:

$$Tp \times 0.37 \leq W \leq Tp \times 0.63$$

with respect to a track pitch Tp of the recording medium.

2. The optical recording medium according to claim 1, wherein an optical head of an optical disk device being used has a laser wavelength of about 650 nm and a numerical aperture of an objective lens of about 0.6, the recording medium has a track pitch of about 0.62 μm, and the pits have a pit width W that falls within the range of 0.23 μm to 0.39 μm.

3. A substrate for an optical recording medium for recording, reproducing, or erasing information by irradiation with a laser beam.

wherein information tracks and addresses are provided on one face of the substrate, the information tracks including groove tracks and land tracks that are arranged either in the form of a spiral or concentric circles, each of the addresses indicating a position on the recording medium and being composed of uneven strings of pits, the strings of pits are arranged so that center lines of the strings of pits are shifted in a radial direction of the recording medium at a distance of about one-half of a track pitch from center lines of the groove tracks and center lines of the land tracks, and a pit width W of the pits satisfies the relationship:

$$Tp \times 0.37 \leq W \leq Tp \times 0.63$$

with respect to a track pitch Tp of the substrate.

4. The substrate for the optical recording medium according to claim 3, wherein an optical head of an optical disk device employing an optical recording medium manufactured using the substrate has a laser wavelength of about 650 nm and a numerical aperture of an objective lens of about 0.6, the substrate has a track pitch of about 0.62 μm, and the pits have a pit width W that falls within the range of 0.23 μto 0.39 μm.

* * * * *

UNITED STATES PATENT AND TRADEMARK OFFICE
CERTIFICATE OF CORRECTION

PATENT NO.       : 7,088,668 B1
APPLICATION NO.  : 10/089402
DATED            : August 8, 2006
INVENTOR(S)      : Akiyama et al.

It is certified that error appears in the above-identified patent and that said Letters Patent is hereby corrected as shown below:

Title Page, first column, PCT Filed: "Jul. 13, 2000" should read --Sep. 13, 2000--
Title Page, second column, abstract, line 4: "use" should read --used--
Title Page, second column, abstract, line 12: "suing" should read --using--
Title Page, second column, abstract, line 13: "base" should read -- based--
Title Page, second column, abstract, line 19: "intermediate" should read --intermediated--
Column 10, line 17(claim 4): "µto" should read --µm to--

Signed and Sealed this

Sixth Day of February, 2007

JON W. DUDAS
*Director of the United States Patent and Trademark Office*